(12) United States Patent
Kurz

(10) Patent No.: US 12,453,845 B1
(45) Date of Patent: Oct. 28, 2025

(54) PORT PROTECTOR

(71) Applicant: Taylor Kurz, New York, NY (US)

(72) Inventor: Taylor Kurz, New York, NY (US)

( * ) Notice: Subject to any disclaimer, the term of this patent is extended or adjusted under 35 U.S.C. 154(b) by 0 days.

(21) Appl. No.: 19/194,415

(22) Filed: Apr. 30, 2025

(51) Int. Cl.
*A61M 39/02* (2006.01)

(52) U.S. Cl.
CPC . *A61M 39/0247* (2013.01); *A61M 2039/0288* (2013.01)

(58) Field of Classification Search
CPC .. A61M 2039/0288; A61M 2025/0246; A61M 2025/0266
See application file for complete search history.

(56) References Cited

U.S. PATENT DOCUMENTS

| | | | | |
|---|---|---|---|---|
| 697,637 | A * | 4/1902 | Lee | A61F 15/008 |
| | | | | 128/888 |
| 2,367,690 | A * | 1/1945 | Purdy | A61F 15/006 |
| | | | | 128/888 |
| 3,782,377 | A * | 1/1974 | Rychlik | A61M 25/02 |
| | | | | 128/DIG. 6 |
| 4,633,863 | A * | 1/1987 | Filips | A61M 25/02 |
| | | | | 128/877 |
| 5,167,240 | A | 12/1992 | Rozier et al. | |
| 5,224,940 | A | 7/1993 | Dann et al. | |
| 7,265,256 | B2 * | 9/2007 | Artenstein | A61F 15/008 |
| | | | | 602/42 |
| 10,456,497 | B2 * | 10/2019 | Howell | A61F 15/008 |
| 2007/0055205 | A1 * | 3/2007 | Wright | A61F 15/004 |
| | | | | 424/447 |
| 2013/0102945 | A1 | 4/2013 | Long | |
| 2015/0119808 | A1 * | 4/2015 | Khalaj | A61M 25/02 |
| | | | | 604/174 |
| 2021/0346666 | A1 | 11/2021 | Erickson | |
| 2021/0369492 | A1 | 12/2021 | O'Grady et al. | |
| 2022/0062613 | A1 | 3/2022 | Beckermann et al. | |
| 2022/0143381 | A1 | 5/2022 | Crain | |
| 2022/0409872 | A1 | 12/2022 | Griner et al. | |
| 2023/0109813 | A1 | 4/2023 | Reid et al. | |
| 2024/0024651 | A1 | 1/2024 | Rosetta-Rangel et al. | |

FOREIGN PATENT DOCUMENTS

WO    WO-9221394 A1 * 12/1992 ............ A61M 25/02

* cited by examiner

*Primary Examiner* — William R Carpenter
(74) *Attorney, Agent, or Firm* — Goldstein Law Offices, P.C.

(57) ABSTRACT

A flexible device for protecting a medical port is provided. The device is configured to absorb high impact forces and protect the medical port. The device comprises a shell selectively attachable to a unitary assembly. The shell includes a dome, a base, and a lip enabling engagement with the unitarity assembly. The unitary assembly comprises a winged adhesive, a compression member, and a collar, each including an aperture and a cutout. The collar is coupled to the winged adhesive, the winged adhesive is coupled to the compression member. The collar includes a groove housing the lip when the shell is attached to the unitary assembly, locking the shell in place for use. The winged adhesive includes arms extending outwardly and an adhesive to attach and detach the device from the user. In operation, the apertures encompass the port and the cutouts permit a port tube to extend through the device.

19 Claims, 6 Drawing Sheets

PORT PROTECTOR

TECHNICAL FIELD

The present disclosure relates generally to a port protector. More particularly, the present disclosure relates to a device for protecting medical ports, such as a chest port, an arm port, a port-a-cath, or an implanted port, which can absorb high impact forces and is flexible to eliminate restrictions on users.

BACKGROUND

Medical professionals have long recognized the importance of protecting a patient's medical port. The medical port allows a tube to attach to the patient's vein to receive chemotherapy, draw blood, complete transfusions and platelets, provide IV nutrition and hydration, and administer drugs. Protecting the port is crucial to avoid infection, being dislodged, and keeping the port clean and dry. However, traditional port protectors do not address these concerns. Indeed, traditional port protectors may be detrimental as they are unable to withstand high impacts, requiring patients to take extreme caution and limit activities to avoid damaging the medical port.

Currently, traditional port protectors fail to address the need for withstanding high impacts. These medical ports are often soft and highly susceptible to any force which frequently leads to patients having to sit out of activities and use high caution in their day-to-day life. Furthermore, children are especially affected by port protectors which cannot withstand high impact. Children are forced to avoid playing sports, riding a bike or scooter, and even roughhousing with friends and siblings, among other things, out of fear the port will be dislodged. These activities frequently shape one's childhood, but children who require medical ports are forced to sit out. While traditional port protectors may be suitable for the particular purpose employed, or for general use, they would not be as suitable for the purpose of the present disclosure as disclosed hereafter.

Accordingly, there is a need for a port protector that can withstand high impact and evenly distribute the pressure outwardly, minimizing the localized stress point. There is also a need for a port protector that is flexible and freely moves with the patient. Such a port protector would provide an efficient means to protect the medical port from being dislodged, even after experiencing a significant force. Such a port protector would allow the patient to participate in any activity and refrain from living life with extreme caution.

In the present disclosure, where a document, act, or item of knowledge is referred to or discussed, this reference or discussion is not an admission that the document, act, or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

One aspect of an example embodiment in the present disclosure is to provide a port protector which can absorb and evenly distribute impact forces. Another aspect of an example embodiment in the present disclosure is to provide a port protector that is flexible and freely moves with the user. Such a port protector will provide an efficient means to protect a user's port from impact, allowing the user to participate freely in activities without fear their port will be dislodged. Accordingly, the present disclosure provides a port protector with a unitary assembly and a shell which can be selectively attached or detached to the unitary assembly.

The shell is hemispherical in shape comprising a dome, a base, and a lip. The dome includes an inner surface, outer surface, an apex, and a bowl. The base is adjacent to the bowl. The lip extends outwardly, substantially perpendicular from the base. The shell further includes a curved edge, the curved edge interconnects the lip and the dome. The cross section of the shell is elliptically shaped, resulting in the inner surface of the dome being in close proximity to the user's port. This creates a close fit between the port protector and the user's port. In embodiments, the shell may include a diameter ranging between 50-80 millimeters. In some embodiments, the shell may include a diameter of approximately 62 millimeters. The shell may comprise of high-density polyethylene, polycarbonate, nylon, or an equivalent high strength material which is capable of absorbing and dispersing energy from an impact.

The unitary assembly comprises a winged adhesive, a compression member, and a collar. The collar is coupled to the winged adhesive, the winged adhesive is coupled to the compression member. The collar is coupled to the winged adhesive and the winged adhesive is coupled to the compression member by an adhesive, such as a silicone adhesive.

The winged adhesive includes a first arm, a second arm, a third arm, a top surface, and a bottom surface. The bottom surface includes an adhesive to removably attach the unitary assembly to the user's skin. The winged adhesive includes a substantially circularly shaped body. A first port opening extends entirely through the body from the top surface to the bottom surface. An inclined wall extends upwardly around the perimeter of the first port opening including a first cutout. The first arm, the second arm, and the third arm each include a first edge and a second edge. The first edge and the second edge of the first arm, the second arm, and the third arm extend outwardly from the body. The first edge and the second edge of the first arm, the second arm, and the third arm are interconnected with an arcuate edge. The first arm is disposed opposite the third arm, the second arm is disposed between the first arm and the second arm. The winged adhesive comprises silicone, thermoplastic polyurethane, or equivalent material, allowing the winged adhesive to flexibly mold to the user.

In operation of some embodiments, when the port protector is in use, the third arm extends beneath the user's armpit across their ribs. The second arm extends upwardly and outwardly towards the shoulder closest to the user's port. The first arm extends upwardly and outwardly towards the shoulder furthest from the user's port. The first arm, the second arm, and the third arm extend outwardly from each other at an angle. In embodiments, the third arm includes a length greater than the first arm and the second arm. In embodiments, the first arm and the second arm are substantially the same length.

The compression member comprises a top surface, a curved bottom surface, and an outer edge perpendicularly extending between the top surface and the bottom surface. The bottom surface curves upwardly in an inward direction such that the bottom surface interconnects a lower end of the outer edge and an inner side of the top surface. A second port opening extends entirely through the compression member from the top surface to the bottom surface. A second cutout extends through the compression member. The compression member comprises silicone, foam, thermoplastic polyurethane, or equivalent material able to absorb energy from an impact.

The flexible collar comprises an annular member including an upper surface, a lower surface, an inner perimeter edge, an outer perimeter edge, and an arcuate wall. The inner perimeter edge and the outer perimeter edge extend perpendicularly between the upper surface and the lower surface. The arcuate wall curves inwardly from the outer perimeter edge toward a center of a third port opening forming an annular groove extending annularly around the collar between the inner perimeter edge, the outer perimeter edge, and the arcuate wall. The groove may house the lip of the shell, preventing the lip from moving in any direction locking the shell in place for use. The third port opening extends entirely through the collar from the upper surface to the lower surface. A third cutout extends through the collar adjacent to the third port opening. The collar comprises thermoplastic polyurethane, thermoplastic copolyesters, or equivalent flexible material allowing the shell to removably attach and detach from the collar.

The first port opening, the second port opening, and the third port opening are concentrically aligned such that the unitary assembly encompasses the user's port when the port protector is in use. The first cutout, the second cutout, and the third cutout are concentrically aligned such that a chemotherapy port tube may freely and comfortably extend through the port protector beneath the user's skin.

The dome absorbs and distributes energy of an impact downward in an outward direction towards the lip and the compression member, resulting in the impact energy being absorbed and dispersed outwardly away from the port. The compression member compresses with the impact, absorbing the force. This protects the user's port, preventing the port from being damaged and dislodged.

In operation of some embodiments, the port protector is attached to the user by first aligning the unitary apertures to the user's port and the unitary cutout to the user's port tube. The user then gently pushes the port protector towards the user until the port protector makes contact with the user's skin. The user then extends the first arm below the user's armpit across their ribs, the second arm upward and outward towards the shoulder closest to the user's port, and the third arm upward and outward towards the shoulder furthest to the user's port. The first arm, the second arm, and the third arm extend outwardly from each other at an angle to maximize contact between the arms and the user's skin. The user gently applies pressure to the first arm, the second arm, and the third arm to engage the adhesive of the winged adhesive to the user's skin.

In operation of other embodiments, a user removes the port protector by gently pulling the first arm, the second arm, and the third arm away from the user's body disengaging the adhesive of the winged adhesive from the user's skin. Once the first arm, the second arm, and the third arm are disengaged from the user's skin the user gently translates the port protector outwardly away from the user keeping the unitary aperture and the unitary cutout aligned with the user's port and port tube to avoid dislodging or damaging the port.

The unitary assembly may be detached from the user and washed with soap and water. This sterilizes the unitary assembly and returns the adhesive qualities to the adhesion of the winged adhesive. The unitary assembly may be cleansed and reused with the shell or the unitary assembly may be replaced after use.

The present disclosure addresses at least one of the foregoing disadvantages. However, it is contemplated that the present disclosure may prove useful in addressing other problems and deficiencies in a number of technical areas. Therefore, the claims should not necessarily be construed as limiting to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
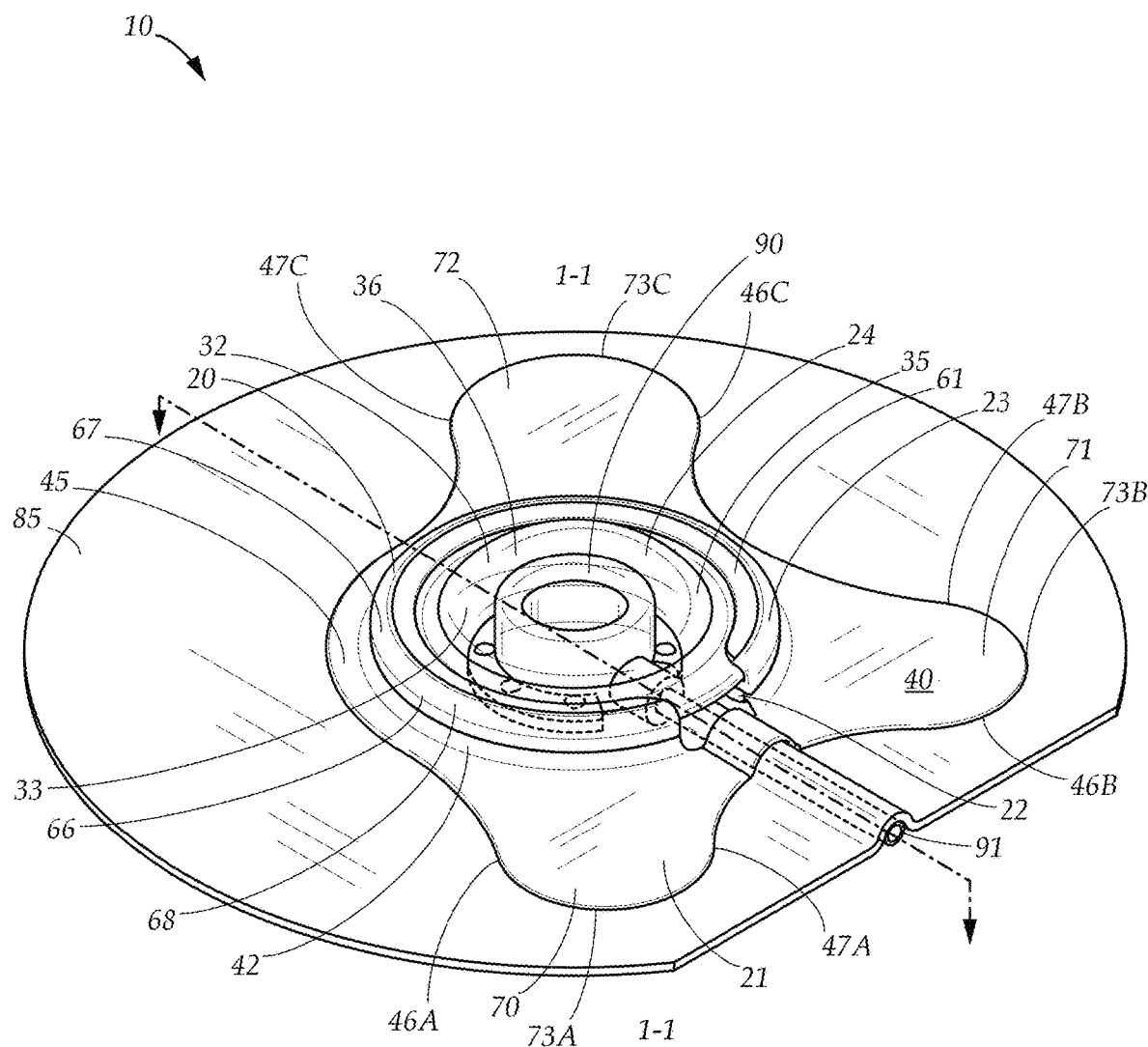
FIG. 1 shows a top perspective view of the port protector in an assembled configuration, illustrating the way in which the port protector covers and protects a medical port in accordance with one embodiment of the present disclosure.
Figure 2:
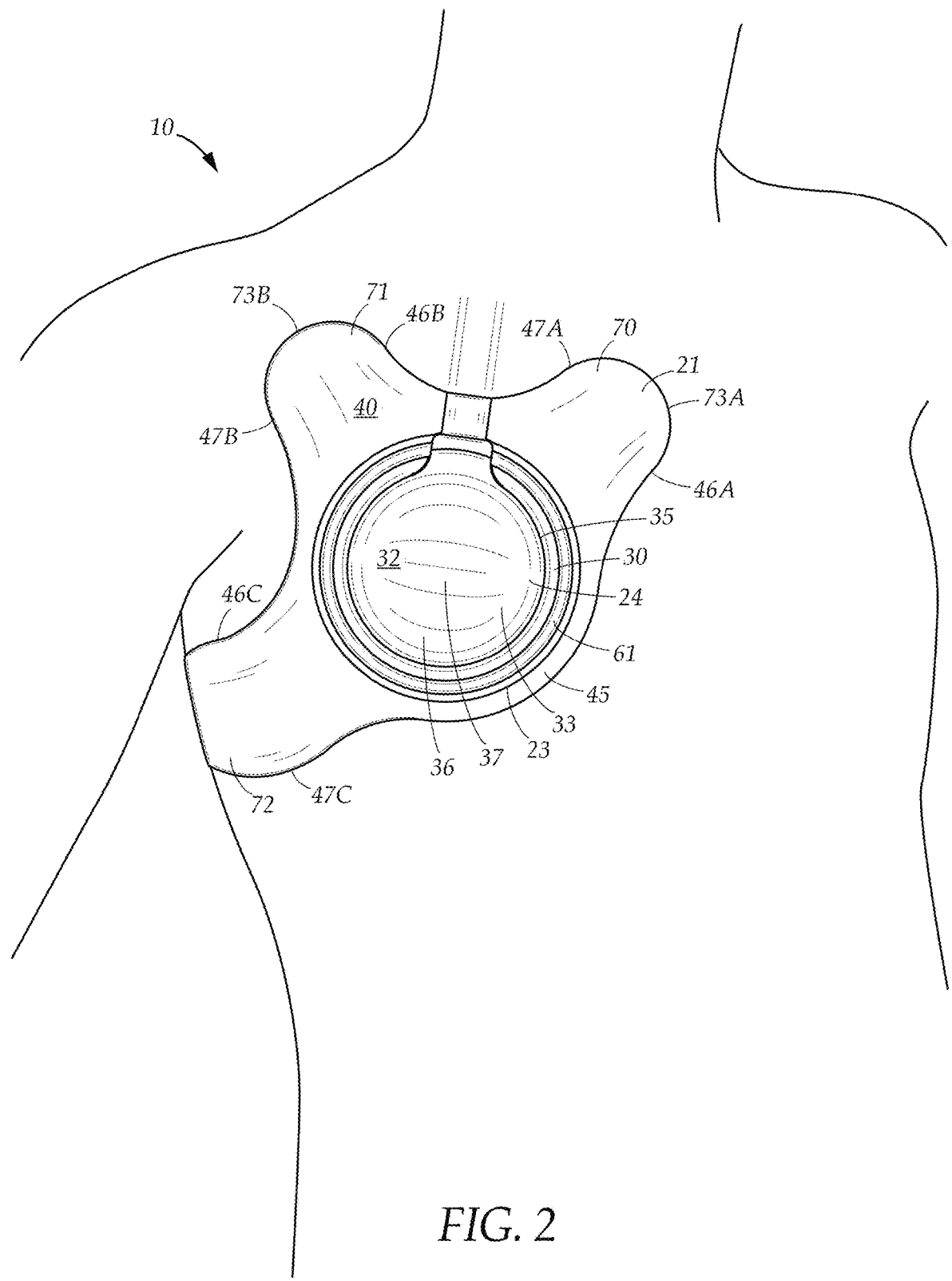
FIG. 2 shows a top plan view of the port protector in use, illustrating the way in which the port protector is oriented on a body when in use in accordance with one embodiment of the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

As discussed above, medical professionals have long recognized the importance of protecting a patient's medical port. As used herein a medical port refers to a chest port, an arm port, a port-a-cath, an implanted port, and any other surgically implanted device used to deliver medications, such as chemotherapy or antibiotics, administer intravenous fluids, bloods transfusions, or nutritional support, and take blood samples. Current products which address these concerns are limited to port protectors which are highly susceptible to forces from impact, resulting in patients having to sit out of activities and use extreme caution in their day-to-day life. While various attempts have been made to address these issues, these solutions are impractical. The embodiment disclosed herein address these and other issues.

Referring to FIG. 1, FIG. 2, FIG. 3, and FIG. 6, the present disclosure provides a port protector 10 which absorbs impact forces enabling the user to participate in activities without fear of dislodging or damaging their port 90. In embodiments, the port protector 10 comprises a shell 24 and a unitary assembly 20. The shell 24 is selectively attachable to the unitary assembly 20. The shell 24 is hemispherical in shape and comprises a dome 36 with an inner surface 31, an outer surface 32, an apex 37, and a bowl 33. A base 34 is adjacent to the bowl 33. A lip 30 extends outwardly substantially perpendicularly from the base 34 of the dome 36 with respect to the bowl 33. In embodiments, a curved edge 35 interconnects the lip 30 and the dome 36. The curved edge 35 aids in translating an impact force exerted on the shell 24 outwardly toward the lip 30 and enables the shell 24 to be more flexible by allowing the bowl 33 to flex at that junction. In embodiments, the cross section of the shell 24 is elliptically shaped resulting in the inner surface 31 of the dome 36 being in close proximity to the user's port 90. This creates a close fit between the port protector 10 and the user's port 90.

In embodiments, the shell 24 comprises high-density polyethylene, polycarbonate, nylon, or an equivalent high strength material capable of absorbing energy from an impact. In embodiments, the shell 24 includes a diameter ranging between 50-80 millimeters. In some embodiments, the shell 24 includes a diameter of approximately 62 millimeters.

Figure 3:
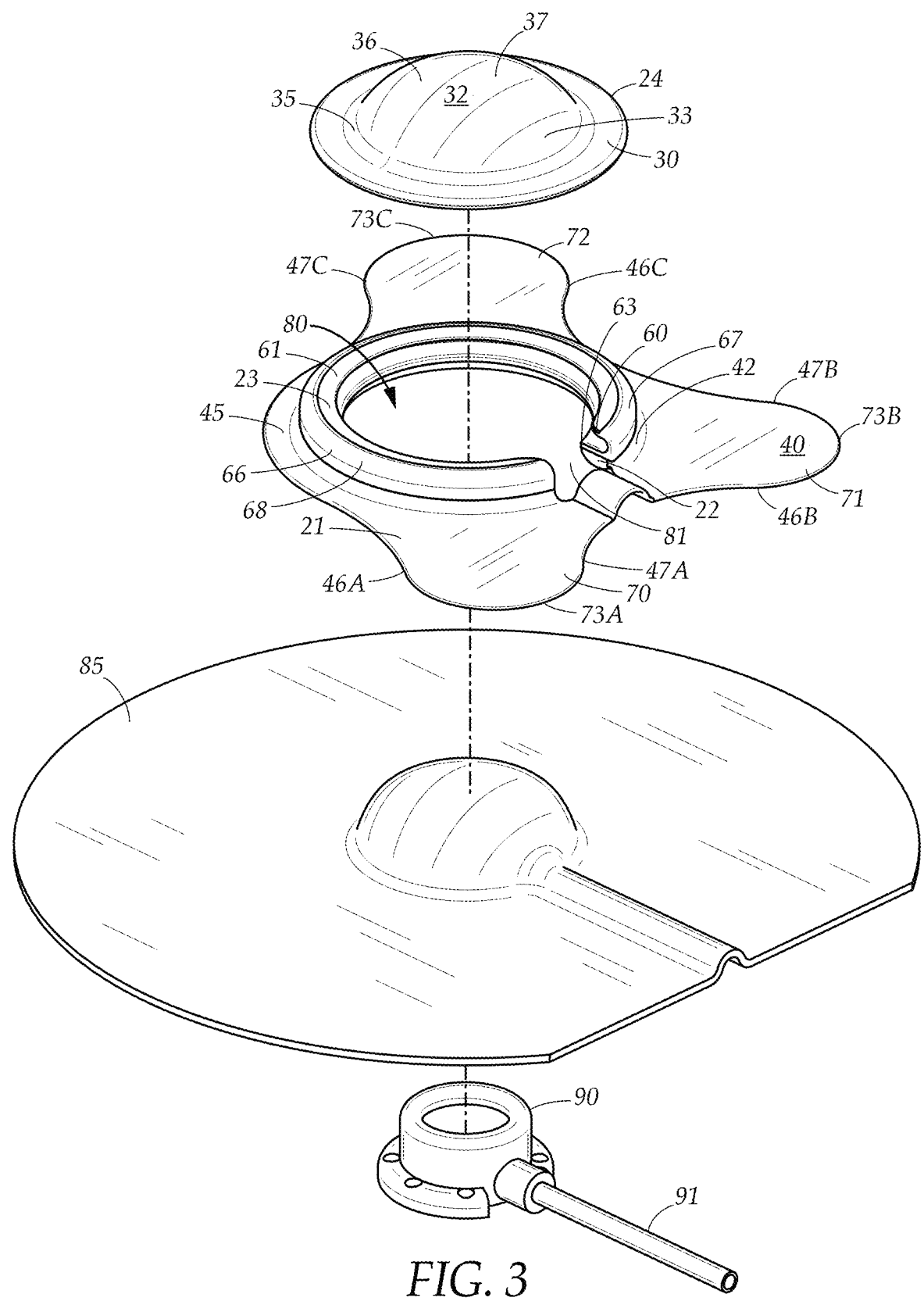
FIG. 3 shows an exploded view of the port protector of FIG. 1 in a disassembled configuration, illustrating the individual components of the port protector and the way in which they assemble in accordance with one embodiment of the present disclosure.
Figure 4:
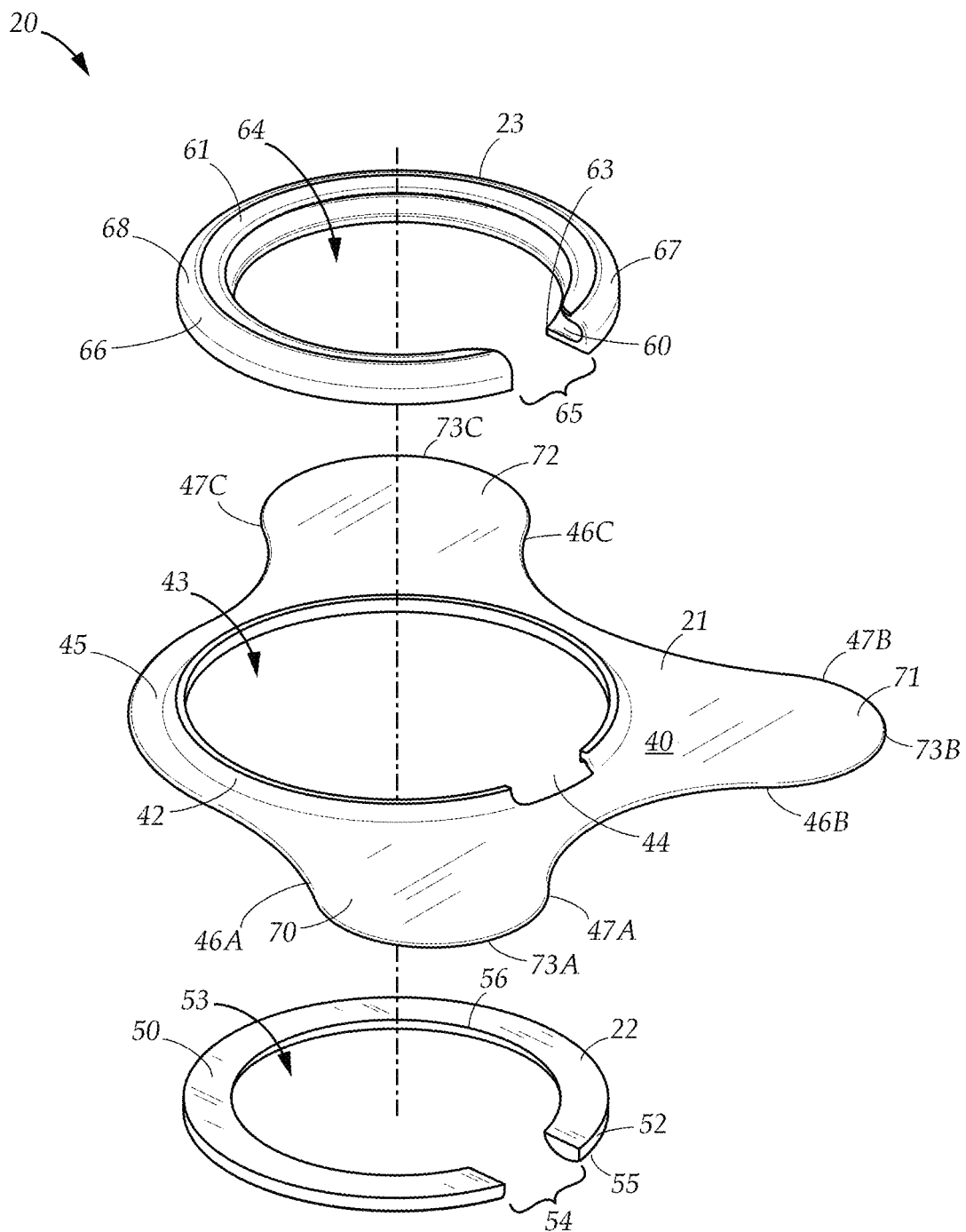
FIG. 4 shows an exploded view of the unitary assembly of the port protector, illustrating a top view of the individual components of the unitary assembly in accordance with one embodiment of the present disclosure.
Figure 5:
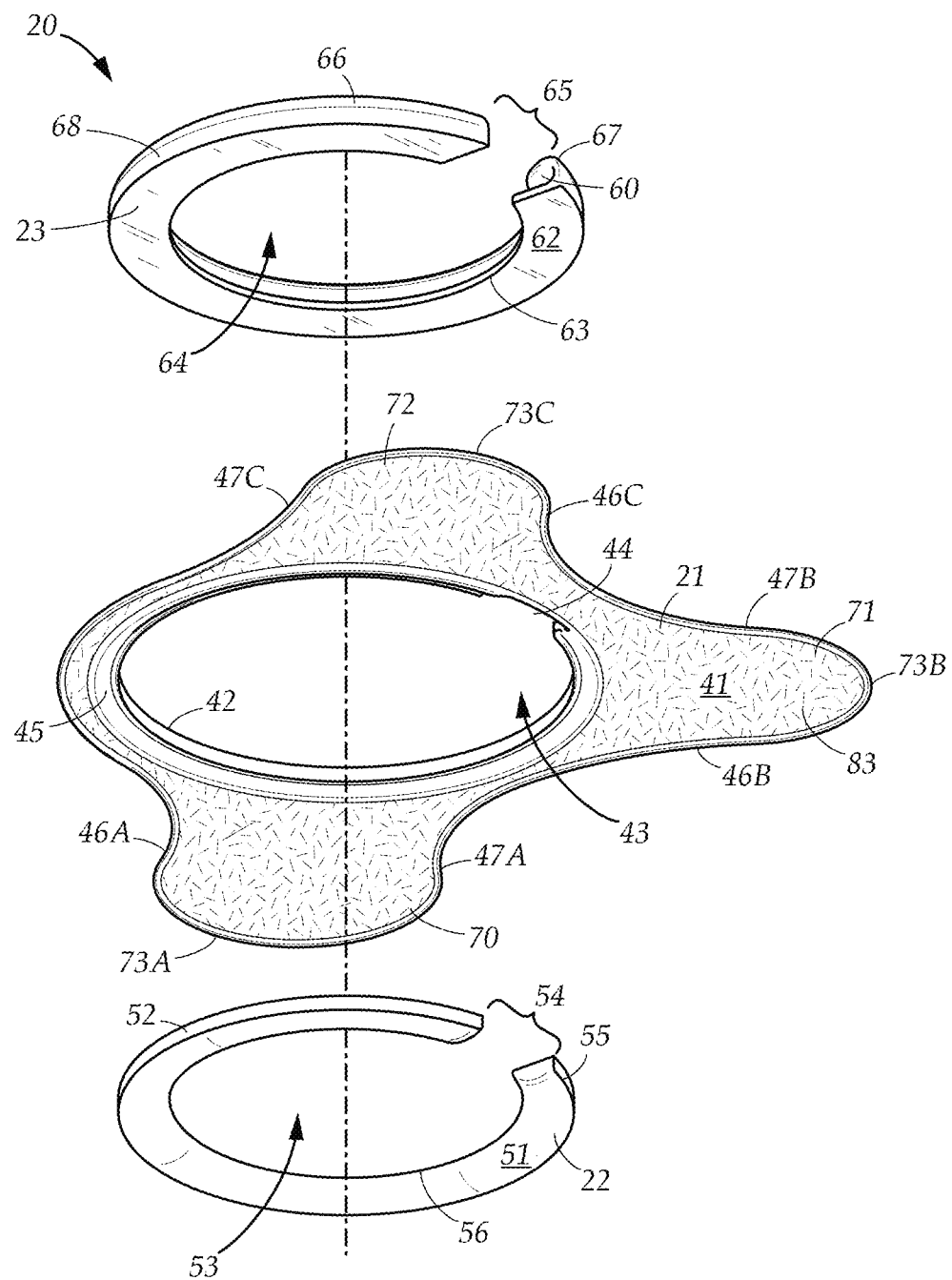
FIG. 5 shows an exploded bottom view of the unitary assembly of FIG. 4, illustrating a bottom view of the individual components of the unitary assembly in accordance with one embodiment of the present disclosure.
Figure 6:
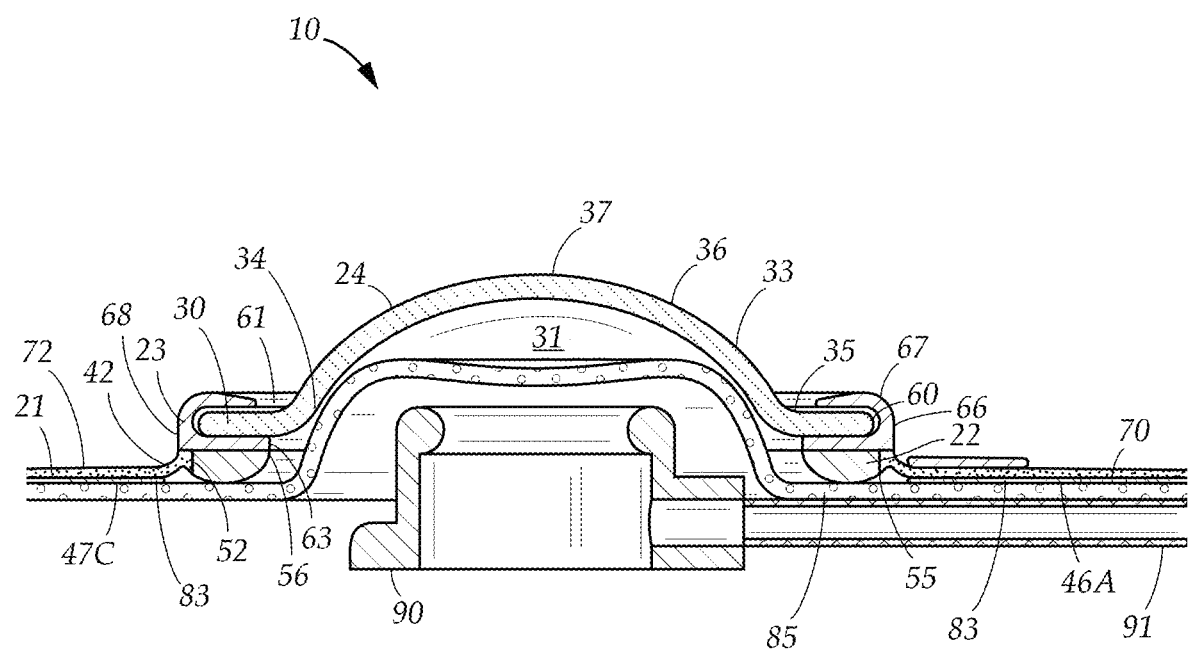
FIG. 6 shows a cross-sectional view of the assembled port protector of FIG. 1 taken along line 1-1 in FIG. 1, illustrating the interior of the assembled protector and orientation of the individual components of the port protector with respect to the medical port when in use in accordance with one embodiment of the present disclosure.

Referring now to FIG. 4 and FIG. 5 while continuing to refer to FIG. 3, the unitary assembly 20 comprises a winged adhesive 21, a compression member 22, and a collar 23. In embodiments, the collar 23 is coupled to the winged adhesive 21 and the winged adhesive 21 is coupled to the compression member 22. The collar 23, the winged adhesive 21, and the compression member 22 are coupled together by an adhesive, such as a silicone adhesive or an equivalent. In another embodiment, the winged adhesive 21, the compression member 22, and the collar 23 are manufactured together as one piece, or monolithically formed. In yet another embodiment, the collar 23, the winged adhesive 21, and the compression member 22 are separate components not coupled to each other, but rather attachable or engageable with one another to enable assembly by the user.

The winged adhesive 21 comprises a substantially circularly shaped body 45 including, a first arm 70, a second arm 71, a third arm 72, a top surface 40, and a bottom surface 41. The bottom surface 41 includes an adhesive 83 to removably attach to a user's skin 85. In embodiments, the adhesive 83 comprises a silicone adhesive or similar equivalent. The adhesive 83 of the bottom surface 41 maintains its adhesive quality for multiple uses, enabling the winged adhesive 21 to be reusable. A first port opening 43 extends entirely through the winged adhesive 21 from the top surface 40 to the bottom surface 41. In embodiments, an inclined wall 42 extends in an upward direction around the perimeter of the first port opening 43. In operation, the collar 23 is coupled to the inclined wall 42 and the inclined wall 42 is coupled to the compression member 22. The incline wall 42 includes a first cutout 44 extending entirely through the incline wall 42 between the first arm 70 and the second arm 71 and into the body 45. The first port opening 43 extends through the winged adhesive 21 at the center of the body 45. The first arm 70, the second arm 71, and the third arm 72 each include a first edge 46A, 46B, 46C and a second edge 47A, 47B, 47C extending outwardly from the body 45. The first edge 46A, 46B, 46C and the second edge 47A, 47B, 47C are each interconnected with an arcuate edge 73A, 73B, 73C. The first arm 70 is disposed opposite the third arm 72, the second arm 71 is disposed between the first arm 70 and the third arm 72. In embodiments, the winged adhesive 21 comprises more than three wings. In other embodiments, the winged adhesive 21 comprises less than three wings.

Referring back to FIG. 1, FIG. 3, FIG. 4, and FIG. 5, in operation of some embodiments, when the port protector 10 is in use, the third arm 72 extends beneath the user's armpit along the user's ribs. The second arm 71 extends upwardly and outwardly towards the shoulder closest to the user's port 90 and the first arm 70 extends upwardly and outwardly towards the shoulder furthest from the user's port 90. The first arm 70, the second arm 71, and the third arm 72 extend outwardly from each other at an angle, maximizing the area of the user's chest engaged with the winged adhesive 21 and maximizing the strength of the adhesive 83 engaging the winged adhesive 21 to the user. Such an orientation of the first arm 70, the second arm 71, and the third arm 72 enables the winged adhesive 21 to efficiently stick to the user and prevents the port protector 10 from disengaging from the user when in use. In embodiments, the third arm 72 includes a length greater than the first arm 70 and the second arm 71 to efficiently engage all contours and curves of a user's side. Further, the third arm 72 may require a greater amount of contact points with the user because as the user raises and moves their arms the skin beneath the armpit stretches and moves. To ensure the third arm 72 maintains engagement with the user, a greater amount of contact points, or surface area adhered to, may be necessary to provide additional adhesion. This eliminates restrictions on the user's movement and activities when using the port protector 10. In embodiments, the first arm 70 and the second arm 71 are substantially the same length resulting in the winged adhesive 21 not being visible beneath clothing.

In embodiments, the winged adhesive 21 comprises of an adhesive silicone, thermoplastic polyurethane, or equivalent flexible material. This enables the winged adhesive 21 to flexibly mold to various counters of a body.

Referring back to FIG. 4, FIG. 5, and FIG. 6, the compression member 22 includes a top surface 50, a curved bottom surface 51, and an outer edge 52. The outer edge 52 extends perpendicularly between the top surface 50 and the bottom surface 51. In embodiments, the curved bottom surface 51 curves upwardly in an inward direction between a lower end 55 of the outer edge 52 and an inner side 56 of the top surface 50. The upward curve of the bottom surface 51 enables the compression member 22 to compress under an impact force more efficiently, allowing the port protector 10 to absorb a greater force. A second port opening 53 extends entirely through the compression member 22 from the top surface 50 to the bottom surface 51. A second cutout 54 extends entirely through the compression member 22 from the top surface 50 to the bottom surface 51 adjacent to the second port opening 53. In embodiments, the compression member 22 comprises silicone, foam, thermoplastic polyurethane, or equivalent material able to absorb energy from an impact.

The flexible collar 23 comprises an annular member 68 including an upper surface 61, a lower surface 62, an inner perimeter edge 63, an outer perimeter edge 66, an arcuate wall 67, and a third port opening 64. The inner perimeter edge 63 and the outer perimeter edge 66 extend perpendicularly between the upper surface 61 and the lower surface 62. In embodiments, the arcuate wall 67 curves inwardly from the outer perimeter edge 66 toward a center of the third port opening 64 forming an annular groove 60 extending annularly around the collar 23 between the inner perimeter edge 63, the outer perimeter edge 66, and the arcuate wall 67. In embodiments, the groove 60 engages the lip 30 of the shell 24 to enable selective attachment of the shell 24 to the collar 23. The groove 60 houses the lip 30 sustaining the lip 30 therein to prevent the shell 24 from moving in any direction and dislodging from the collar 23. This locks the shell 24 in place for use. The third port opening 64 extends entirely through the collar 23 from the upper surface 61 to the lower surface 62. A third cutout 65 extends entirely through the collar 23 from the upper surface 61 to the lower surface 62 adjacent to the third port opening 64. In embodiments, the upper surface 61 is curved downwardly towards the third port opening 64. This enables the collar 23 to lock the lip 30 in place when housed within the groove 60. In embodiments, the collar 23 comprises of thermoplastic polyurethane, thermoplastic copolyesters, or equivalent flexible material.

Referring back to FIG. 1, FIG. 3, FIG. 4, and FIG. 5, the first port opening 43, the second port opening 53, and the third port opening 64 are concentrically aligned such that a center of the third port opening 64, a center of the second port opening 53, and a center of the first port opening 43 are all vertically aligned when assembled. This defines a unitary aperture 80 which encompasses the user's port 90 when in use. The first cutout 44, the second cutout 54, and the third cutout 65 are vertically aligned defining a unitary cutout 81. The unitary cutout 81 enables a port tube 91, such as a chemotherapy port tube, to comfortably extend through the port protector 10 beneath the user's skin 85. In operation of some embodiments, the port tube 91 extends from the user's port 90 through the unitary cutout 81.

Referring back to FIG. 1, FIG. 2, and FIG. 6, in operation of some embodiments, the dome 36 absorbs and distributes energy from an impact downward in an outward direction towards the lip 30 and the compression member 22. This translates the energy of the force from the impact location away from the port 90. The compression member 22 compresses with the energy of the force, absorbing the energy. This distributes the pressure of an impact evenly in an outward direction, away from the user's port 90, minimizing localized stress points. This significantly reduces the impact of a force to the user's port 90, preventing the port 90 from dislodging or becoming damaged.

Referring back to FIG. 2, FIG. 3, and FIG. 6, in operation of some embodiments, the port protector 10 is attached to the user by first aligning the unitary aperture 80 to the user's port 90 and the unitary cutout 81 to the user's port tube 91. The user then gently pushes the port protector 10 towards the user until the port protector 10 makes contact with the user's skin 85, the alignment of the unitary aperture 80 with the user's port 90 and the unitary cutout 81 to the user's port tube 91 enable the port protector 10 to engage with the user without knocking or dislodging the user's port 90 while the port tube 91 comfortably extends beneath the port protector 10. The user then extends the first arm 70 below the user's armpit across their ribs, the second arm 71 upwardly and outwardly toward the shoulder closest to the user's port 90, and the third arm 72 upwardly and outwardly toward the shoulder furthest from the user's port 90. In embodiments, the first arm 70, the second arm 71, and the third arm 72 extend outwardly from each other at an angle, maximizing contact between the arms 70, 71, 72 and the user's skin 85. The user gently applies pressure to the first arm 70, the second arm 71, and the third arm 72 to engage the adhesive 83 of the winged adhesive 21 to the user's skin 85, enabling the port protector 10 to attach to the user.

In operation of some embodiments, a user removes the port protector 10 by gently pulling the first arm 70, the second arm 71, and the third arm 72 away from the user's body, disengaging the adhesive 83 of the winged adhesive 21 from the user's skin 85. Once the first arm 70, the second arm 71, and the third arm 72 are disengaged from the user's skin 85 the user gently translates the port protector 10 outwardly away from the user keeping the unitary aperture 80 and the unitary cutout 81 aligned with the user's port 90 and port tube 91 to avoid dislodging or damaging the port 90. The user can then store the port protector 10.

Referring back to FIG. 1, FIG. 4, and FIG. 6, the port protector 10 is reusable. In embodiments, the port protector 10 may be detached from the user to be cleaned. The shell 24 is removed from the unitary assembly 20, then the unitary assembly 20 may be cleansed, for example, with soap and water. Cleaning the unitary assembly 20 sterilizes the device and enables the adhesion of the winged adhesive 21 to regain its adhesive qualities. This permits the winged adhesive 21 to be reapplied to the user while maintaining the effectiveness of its adhesive qualities. In embodiments, the unitary assembly 20 may be used approximately 15 times before replacing it with a new unitary assembly 20. In embodiments, the shell 24 does not require replacement.

It is understood that when an element is referred hereinabove as being "on" another element, it can be directly on the other element or intervening elements may be presented therebetween. In contrast, when an element is referred to as being "directly on" another element, there is no intervening element present.

Moreover, any compounds or materials can be formed from a same, structurally continuous piece, or separately fabricated and connected.

It is further understood that, although ordinal terms, such as "first", "second", "third", are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer", or "section" discussed below could be termed a second element, component, region, layer, or section without departing from the teachings herein.

Spatially, relative terms, such as "beneath", "below", "lower", "above", "upper", and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term and being described and/or within a tolerance level known in the art and/or within 5% thereof.

Example embodiments are described herein with references to cross sections illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviation in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a port protector 10. The disclosure is illustrated by example in the drawing figures, and throughout the written description. It should be understood that numerous variations are possible, while adhering to the inventive scope. Such variations are contemplated as being part of the present disclosure.

What is claimed is:

1. A device for protecting a medical port including a port tube, comprising:
    a hemispherical shell including a dome with an inner surface, an outer surface, an apex, a bowl, a base, and a lip, the lip extending outwardly substantially perpendicular from the base, the shell configured to absorb high impact forces and distribute them away from a medical port to protect the medical port; and
    a unitary assembly comprising a winged adhesive configured to attach to a surface of a user's body, a compression member configured to absorb impact forces, and a collar configured to engage the shell, the collar coupled to the winged adhesive, the winged adhesive coupled to the compression member;
    wherein:
    the winged adhesive includes a first arm, a second arm, a third arm, a top surface, and a bottom surface with an adhesive to removably attach to the surface of the user's body, wherein a first port opening extends entirely through the winged adhesive from the top surface to the bottom surface, an inclined wall extending in an upward direction around a perimeter of the first port opening including a first cutout between the first arm and the second arm;
    the compression member includes a top surface, a curved bottom surface, an outer edge, a second port opening, and a second cutout, the outer edge extending perpendicularly between the top surface and the bottom surface, the bottom surface curving upwardly in an inward direction such that the bottom surface connects a lower end of the outer edge and an inner side of the top surface, the second port opening extending entirely though the compression member from the top surface to the bottom surface, the second cutout extending through the compression member;
    the flexible collar comprises an annular member including an upper surface, a lower surface, and an inner perimeter edge, an outer perimeter edge, an arcuate wall, a groove, a third port opening, and a third cutout, the inner perimeter edge and the outer perimeter edge extending perpendicularly between the upper surface and the lower surface, the arcuate wall defining an annular groove disposed between the inner perimeter edge, the outer perimeter edge, and the arcuate wall, the groove configured to engage and house the lip of the shell, the third port opening extending entirely through the collar from the upper surface to the lower surface, the third cutout extending between the collar;
    the first port opening, the second port opening, and the third port opening are concentrically aligned such that the unitary assembly is configured to receive and house the medical port therein when in use; and
    the first cutout, the second cutout, and the third cutout are aligned such that a port tube may comfortably extend through the unitary assembly beneath the user's skin.

2. The device of claim 1, wherein the groove engages the lip of the shell to enable selective attachment of the shell to the collar such that the groove houses the lip.

3. The device of claim 2, wherein the groove prevents the lip from moving in any direction, locking the shell in place for use.

4. The device of claim 1, wherein the cross section of the shell is elliptically shaped resulting in the inner surface of the dome being configured to be in close proximity to the user's port creating a close fit.

5. The device of claim 1, wherein the shell further comprises a curved edge interconnecting the lip and the dome.

6. The device of claim 1, wherein:
    the winged adhesive comprises a substantially circularly shaped body; and
    the first port opening extends through the winged adhesive at the center of the body.

7. The device of claim 6, wherein:
    the first arm, the second arm, and the third arm each include a first edge and a second edge extending outwardly from the body interconnected with an arcuate edge; and
    the first arm is opposite the third arm, the second arm between the first arm and the third arm.

8. The device of claim 1, wherein the upper surface of the collar is curved downwardly, towards the third port opening.

9. The device of claim 1, wherein:
    the center of the first port opening, the second port opening, and the third port opening are vertically aligned defining a unitary aperture which is configured to encompass the user's port in use; and
    the first cutout, the second cutout, and the third cutout are vertically aligned defining a unitary cutout, the port tube configured to extend from the user's port through the unitary cutout.

10. The device of claim 9, wherein the device is configured to be attached to the user by:
    aligning the unitary aperture to the user's port, aligning the unitary cutout to the user's port tube, gently translating the device towards the user until the device makes contact with the user's skin;
    extending the first arm below the user's armpit across their ribs, the second arm upwardly and outwardly toward the shoulder closest to the user's port, the third arm upwardly and outwardly toward the shoulder furthest to from the user's port such that the first arm, the second arm, and the third arm extend outwardly from each other at an angle; and
    gently applying pressure to the first arm, the second arm, and the third arm to engage the adhesive of the winged adhesive to the user's skin.

11. The device of claim 1, wherein:
    the dome is configured to absorb and distribute energy of an impact downward towards the lip and the compression member, translating the energy of an impact outwardly away from the port; and the compression member is configured to compress with the impact energy, absorbing the energy resulting in the device preventing damage to the user's port.

12. The device of claim 1, wherein the winged adhesive comprises an adhesive silicone, thermoplastic polyurethane, or an adhesive material allowing the winged adhesive to flexibly mold to the user.

13. The device of claim 1, wherein the collar is coupled to the winged adhesive and the winged adhesive is coupled to the compression member by an adhesive or is monolithically formed.

14. The device of claim 1, wherein the third arm includes a length greater than the first arm and the second arm, the first arm and the second arm are substantially the same length.

15. The device of claim 1, wherein the shell includes a diameter ranging between 50 millimeters and 80 millimeters.

16. The device of claim 1, wherein the shell comprises high-density polyethylene, polycarbonate, or a high strength material capable of absorbing energy from an impact.

17. The device of claim 1, wherein the collar comprises thermoplastic polyurethane, thermoplastic copolyesters, or a flexible material.

18. The device of claim 1, wherein the compression member comprises silicone, foam, thermoplastic polyurethane, or a material able to absorb energy from an impact.

19. The device of claim 1, wherein:
the unitary assembly may be detached from the user and cleaned, resulting in the adhesion of the winged adhesive to regain its adhesive qualities; and
the unitary assembly may be cleaned and reused with the shell or the unitary assembly may be replaced after use.

* * * * *